United States Patent
Burla et al.

(10) Patent No.: US 12,229,476 B2
(45) Date of Patent: Feb. 18, 2025

(54) COMPUTER AIDED GENERATIVE DESIGN WITH MODAL ANALYSIS DRIVEN SHAPE MODIFICATION PROCESS

(71) Applicant: Autodesk, Inc., San Francisco, CA (US)

(72) Inventors: Ravi Kumar Burla, Novi, MI (US); Jesus Rodriguez, Farmington, MI (US); Siavash Navadeh Meshkat, Carlsbad, CA (US); Jaesung Eom, Wexford, PA (US)

(73) Assignee: Autodesk, Inc., San Francisco, CA (US)

( * ) Notice: Subject to any disclaimer, the term of this patent is extended or adjusted under 35 U.S.C. 154(b) by 825 days.

(21) Appl. No.: 17/236,917

(22) Filed: Apr. 21, 2021

(65) Prior Publication Data
US 2022/0358255 A1 Nov. 10, 2022

(51) Int. Cl.
*G06F 30/12* (2020.01)
*G06F 17/16* (2006.01)
*G06F 30/10* (2020.01)
*G06F 30/20* (2020.01)
*G06N 3/0475* (2023.01)

(52) U.S. Cl.
CPC .............. *G06F 30/12* (2020.01); *G06F 17/16* (2013.01); *G06F 30/10* (2020.01); *G06F 30/20* (2020.01); *G06N 3/0475* (2023.01)

(58) Field of Classification Search
None
See application file for complete search history.

(56) References Cited

U.S. PATENT DOCUMENTS 5,841,892 A * 11/1998 McGrath ................... G06T 7/73
  382/173
7,552,032 B2 * 6/2009 Krishnapillai .......... G06F 30/00
  703/2

(Continued)

OTHER PUBLICATIONS

Allaire, Grégoire, and Georgios Michailidis. "Modal basis approaches in shape and topology optimization of frequency response problems." International Journal for Numerical Methods in Engineering 113.8 (2018): 1258-1299. (Year: 2018).*

(Continued)

*Primary Examiner* — Akash Saxena
(74) *Attorney, Agent, or Firm* — Fish & Richardson P.C.

(57) ABSTRACT

Methods, systems, and apparatus, including medium-encoded computer program products, for computer aided design of physical structures using generative design processes include: obtaining one or more design criteria, a model of an object for which a physical structure is to be manufactured, and a set of eigenmodes from a modal analysis of the model of the object; extracting a proper subset of non-zero eigenmodes from the set of eigenmodes, wherein the proper subset of non-zero eigenmodes include at least three lowest valued, non-zero eigenmodes; combining data of the proper subset of non-zero eigenmodes to form a strain energy field for the model of the object; iteratively modifying a generatively designed shape of the model of the object using the strain energy field to drive changes to the generatively designed shape of the model; and providing the generatively designed shape of the model of the object.

20 Claims, 6 Drawing Sheets

(56) References Cited

U.S. PATENT DOCUMENTS

| | | | | |
|---|---|---|---|---|
| 9,978,177 | B2* | 5/2018 | Mehr | G06T 7/194 |
| 11,321,508 | B2* | 5/2022 | Harris | G05B 15/02 |
| 11,663,379 | B2* | 5/2023 | Harris | G06T 17/10 |
| | | | | 703/2 |
| 11,675,333 | B2* | 6/2023 | Bandara | G06F 30/27 |
| | | | | 700/98 |
| 2004/0194051 | A1* | 9/2004 | Croft | G06F 30/23 |
| | | | | 703/2 |
| 2006/0139347 | A1* | 6/2006 | Choi | G06T 17/00 |
| | | | | 345/419 |
| 2006/0259283 | A1* | 11/2006 | Brughmans | G06F 30/15 |
| | | | | 703/2 |
| 2012/0179430 | A1* | 7/2012 | Aish | G06F 8/34 |
| | | | | 703/1 |
| 2014/0214370 | A1* | 7/2014 | Olhofer | G06F 30/23 |
| | | | | 703/1 |
| 2016/0009368 | A1* | 1/2016 | Kismarton | B64C 3/26 |
| | | | | 428/113 |
| 2016/0253444 | A1* | 9/2016 | Rodrigues | G06F 30/23 |
| | | | | 703/2 |
| 2016/0321384 | A1* | 11/2016 | Pal | B33Y 50/02 |
| 2017/0193699 | A1* | 7/2017 | Mehr | G06F 17/10 |
| 2018/0345647 | A1 | 12/2018 | Morris et al. | |
| 2018/0349531 | A1 | 12/2018 | Morris et al. | |
| 2019/0236220 | A1* | 8/2019 | Nomura | G06F 30/20 |
| 2019/0272356 | A1* | 9/2019 | Trivedi | G06F 30/20 |
| 2020/0065429 | A1* | 2/2020 | Nakhjavani | G06F 30/20 |
| 2020/0143009 | A1* | 5/2020 | Schmidt | G06F 30/23 |
| 2020/0150623 | A1 | 5/2020 | Bandara et al. | |
| 2020/0151286 | A1 | 5/2020 | Willis et al. | |
| 2020/0156323 | A1* | 5/2020 | Woytowitz | G06F 30/23 |
| 2020/0191766 | A1* | 6/2020 | Kim | G01N 33/4833 |
| 2020/0356638 | A1* | 11/2020 | Nomura | G06F 30/15 |
| 2021/0182456 | A1* | 6/2021 | Couret | G06T 17/205 |
| 2021/0279384 | A1* | 9/2021 | Bahamonde Jacome | |
| | | | | G06F 30/23 |
| 2021/0350036 | A1* | 11/2021 | Burla | G06F 30/20 |
| 2021/0406412 | A1* | 12/2021 | Cramer | G06F 30/10 |
| 2022/0250342 | A1* | 8/2022 | Metzner | B33Y 70/10 |
| 2022/0405442 | A1* | 12/2022 | Schmidt | G06F 30/10 |
| 2024/0012956 | A1* | 1/2024 | Rauh | G06F 30/17 |

OTHER PUBLICATIONS

Dewulf, W.; De Roeck, G.. Modal strain energy method critically revised Proceedings of the SPIE—The International Society for Optical Engineering 3989: 99-110. SPIE—Int. Soc. Opt. Eng. (2000) (Year: 2000).*

Sigmund, Ole, and Joakim Petersson. "Numerical instabilities in topology optimization: a survey on procedures dealing with checkerboards, mesh-dependencies and local minima." Structural optimization 16 (1998): 68-75. (Year: 1998).*

Dienemann, R., A. Schumacher, and S. Fiebig. "Topology optimization for finding shell structures manufactured by deep drawing." Structural and Multidisciplinary Optimization 56 (2017): 473-485. (Year: 2017).*

Völkl, Harald, et al. "An efficient bionic topology optimization method for transversely isotropic materials." Composite Structures 204 (2018): 359-367. (Year: 2018).*

Xia, L., Xia, Q., Huang, X et al. Bi-directional Evolutionary Structural Optimization on Advanced Structures and Materials: A Comprehensive Review. Arch Computat Methods Eng 25, 437-478, Published Nov. 19, 2016 (Year: 2016).*

Allaire et al., "Modal basis approaches in shape and topology optimization of frequency response problems," International Journal for Numerical Methods in Engineering, Feb. 2017, 113(8):1258-1299.

Allaire et al., "Structural optimization under overhang constraints imposed by additive manufacturing technologies," Journal of Computational Physics, Sep. 2017, 351:295-328.

Dalklint et al., "Eigenfrequency constrained topology optimization of finite strain hyperelastic structures," Struct Multidisc Optim, May 2020, 61(6):2577-2594.

Extended European Search Report in European Appln. No. 22167040.9, dated Sep. 2, 2022, 16 pages.

Liu et al., "Eigenvalue topology optimization of structures using a parameterized level set method," Struct Multidisc Optim, Apr. 2014, 50(4):573-591.

Yamada et al., "A topology optimization method based on the level set method incorporating a fictitious interface energy," Comput. Methods Appl. Mech. Engrg., Nov. 2010, 199(45-48):2876-2891.

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

Autodesk.com [online], "Section 21: Modal or Natural Frequency Analysis," published on Nov. 8, 2018, retrieved Apr. 12, 2021, retrieved from URL<https://knowledge.autodesk.com/support/inventor-nastran>, 11 pages.

Autodesk.com [online], "Section 22: Modal Analysis Exercise," published on Nov. 8, 2018, retrieved on Apr. 12, 2021, retrieved from URL<https://knowledge.autodesk.com/>, 21 pages.

Brackett et al., "Topology Optimization for Additive Manufacturing," in Proceedings of the Solid Freeform Fabrication Symposium (2011) 15 pages.

Dapogny et al., "Geometric Constraints for Shape and Topology Optimization in Architectural Design," Computational Mechanics, Springer-Verlag, 2017, 59(6):933-965.10.1007/s00466-017-1383-6. hal-01354004v3.

Gibou et al., "A Review of Level-set Methods and Some Recent Applications," Journal of Computational Physics (2018) 353:82-109.

Guest and Zhu, "Casting and Milling Restrictions in Topology Optimization via Projection-based Algorithms," in ASME 2012 International Design Engineering Technical Conferences and Computers and Information in Engineering Conference (2012) 8 pages.

Ikeya and Shimoda, "Multi-objective Free-form Optimization for Shape and Thickness of Shell Structures with Composite Materials," in 11th World Congress on Structural and Multidisciplinary Optimisation (2015) 6 pages.

Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.

Liu and Ma, "A Survey of Manufacturing Oriented Topology Optimization Methods," Advances in Engineering Software (2016) 100:161-175.

Liu et al., "Current and Future Trends in Topology Optimization for Additive Manufacturing," Structural and Multidisciplinary Optimization (2018) 57:2457-2483.

Lu et al., "Build-to-Last: Strength to Weight 3D Printed Objects," ACM Trans. Graph. (2014) 33(4):97:1-97:10.

Nakayama and Shimoda, "Shape-topology Optimization for Designing Shell Structures," in VII European Congress on Computational Methods in Applied Sciences and Engineering (2016) 10 pages.

PTC.com [online], "Model Analysis," published on or before Apr. 12, 2021, retrieved on Feb. 12, 2021, retrieved from URL<https://www.ptc.com/en/technologies/cad/simulation-and-analysis/model-analysis>, 3 pages.

Sigmund and Maute, "Topology Optimization Approaches—a Comparative Review," Struct. Multidisc. Optim. (2013) 48:1031-1055.

Unknown author, "Topology Optimization R18.0 Feature and Usage Highlights," © 2016 ANSYS, Inc., Mar. 12, 2017, 29 pages.

Van Dijk et al., "Level-set Methods for Structural Topology Optimization: a Review," Struct. Multidisc. Optim. (2013) 48:437-472.

Vatanabe et al., "Topology Optimization with Manufacturing Constraints: a Unified Projection-based Approach," Advances in Engineering Software (2016) 100:97-112.

Visweswaran, "Modal Analysis—What is it and How is it Useful?," Graphler Technology Solutions, Dec. 25, 2020, 4 pages.

Xia et al., "A Level Set Based Method for the Optimization of Cast Part," Struct. Multidisc. Optim. (2010) 41:735-747.

(56) References Cited

OTHER PUBLICATIONS

Liu et al., "Concurrent deposition path planning and structural topology optimization for additive manufacturing," Rapid Prototyping Journal, Aug. 2017, 23(5):930-942.
Office Action in European Appln. No. 22167040.9, dated Dec. 16, 2024, 14 pages.

\* cited by examiner

COMPUTER AIDED GENERATIVE DESIGN WITH MODAL ANALYSIS DRIVEN SHAPE MODIFICATION PROCESS

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries that separate the parts from surrounding space. In a B-Rep model (often referred to as a B-Rep), geometry is stored in the computer using smooth and precise mathematical surfaces, in contrast to the discrete and approximate surfaces of a mesh model, which may limit the accuracy of CAD modeling. Moreover, various CAD programs implement different processes for numerical simulation, analysis and reporting of the physical properties of a B-Rep model, such as performing modal analysis of a 3D model of a part to enable optimization of the natural frequencies of the structure, or to satisfy a modal constraint, e.g. the natural frequency of the structure must be larger than a minimum value.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry using topology optimization in generative design of a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, examples of design constraints include maximum mass, maximum deflection under load, maximum stress, etc.

The inputs to a generative design process can include a set of solids (B-Rep input) and the user can define boundary conditions (mechanical load(s), physical constraint(s), or both) for one or more input solids of the set. Further, many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver. The set of input solids can include "preserve bodies", which should always be present in the design and which represent interfaces to other parts or locations on which boundary conditions can be applied. Other regions in which geometry should or should not be generated can also be provided in a similar manner, such as input solids that define "obstacle bodies", which represent regions where new geometry should not be generated.

SUMMARY

This specification describes technologies relating to computer aided design of physical structures using generative design processes, where boundary conditions (e.g., structural loads and constraints) need not be specified to drive shape modification.

In general, one or more aspects of the subject matter described in this specification can be embodied in one or more methods (and also one or more non-transitory computer-readable mediums tangibly encoding a computer program operable to cause data processing apparatus to perform operations) including: obtaining one or more design criteria, a three dimensional model of an object for which a corresponding physical structure is to be manufactured, and a set of eigenmodes from a modal analysis of the three dimensional model of the object; extracting a proper subset of non-zero eigenmodes from the set of eigenmodes from the modal analysis, wherein the proper subset of non-zero eigenmodes include at least three lowest valued, non-zero eigenmodes from the set of eigenmodes; combining data of the proper subset of non-zero eigenmodes to form a strain energy field for the three dimensional model of the object; iteratively modifying a generatively designed shape of the three dimensional model of the object using the strain energy field to drive changes to the generatively designed shape of the three dimensional model; and providing the generatively designed shape of the three dimensional model of the object, which is useable in manufacturing the physical structure using one or more computer-controlled manufacturing systems. Other embodiments of this aspect include corresponding computer systems, apparatus, and computer programs recorded on one or more computer storage devices, each configured to perform the actions of the methods. The foregoing and other embodiments can each optionally include one or more of the following features, alone or in combination.

Combining the data can include making the strain energy field equal to a sum of equally weighted strain energies of the proper subset of non-zero eigenmodes. The proper subset of non-zero eigenmodes can be less than ten eigenmodes, and combining the data can include defining the strain energy field as a weighted average of strain energies of the less than ten eigenmodes, wherein a weight for each eigenmode is inversely proportional to the eigenvalue of the eigenmode.

The method can include obtaining one or more frequencies of vibration for which structural performance of the physical structure is to be enhanced; extracting the proper subset of non-zero eigenmodes can include extracting from the set of eigenmodes one or more non-zero eigenmodes that correspond to the one or more frequencies of vibration, such that the proper subset of non-zero eigenmodes includes the one or more non-zero eigenmodes that correspond to the one or more frequencies of vibration; and combining the data can include defining the strain energy field as a weighted average of strain energies of the proper subset of non-zero eigenmodes.

The one or more design criteria can include a target volume reduction of fifty percent or less of an original volume of the three dimensional model of the object, and iteratively modifying the generatively designed shape of the three dimensional model of the object can include: recalculating a shape change velocity field for the generatively designed shape in each of multiple iterations using the same strain energy field; and updating the generatively designed shape in each of the multiple iterations using the recalculated shape change velocity field.

Iteratively modifying the generatively designed shape of the three dimensional model of the object can include, upon each completion of a percentage reduction in volume for the generatively designed shape that is less than the target volume reduction, re-computing the strain energy field, the re-computing includes: obtaining an updated set of eigenmodes from an updated modal analysis of the generatively designed shape of the three dimensional model of the object; extracting an updated proper subset of non-zero eigenmodes from the updated set of eigenmodes from the updated modal analysis; and combining data of the updated proper subset of non-zero eigenmodes to update the strain energy field used in the iteratively modifying. Further, the one or more design criteria can include a manufacturing constraint, and the iteratively modifying can include performing the re-computing of the strain energy field whenever the manufacturing constraint is violated in a given iteration of the iteratively modifying.

The method can include using a boundary condition specification for the three dimensional model of the object to drive the changes to the generatively designed shape of the three dimensional model during the iteratively modification. The iteratively modification can be performed without any input regarding boundary conditions for the three dimensional model of the object. Moreover, the providing can include: generating toolpath specifications for a manufacturing machine using the generatively designed shape of the three dimensional model of the object; and manufacturing at least a portion of the physical structure, or a mold for the physical structure, with the manufacturing machine using the toolpath specifications.

Particular embodiments of the subject matter described in this specification can be implemented to realize one or more of the following advantages. Modal analysis of a 3D model of a structure to be manufactured can be leveraged to drive shape evolution of the 3D model of the structure in a generative design process that is readily scalable and adaptable, providing the ability to consume substantially less processing resources than traditional generative design when desired (e.g., when running the generative design process on a CAD client system without cloud-computing support) but also the ability to produce finer generative design outcomes using more processing resources (e.g., when running the generative design process on a CAD client system with cloud-computing support). Analysis of the eigenvalues of a finite element stiffness matrix is used to find the most plausible strain energy field for any given geometry. Thus, a strain energy field can be synthesized from one or more of the modal shapes of the stiffness matrix (a subset of the modes) and then be used to drive generative design with minimal user inputs, thereby making generative design easier to use while still delivering physically based solutions with minimal user effort.

Better structural designs for a 3D model can be achieved by driving shape modification in accordance with physical principles that are captured in a strain energy field formed for the 3D model from normal modes of that 3D model. Moreover, these better designs can be achieved even when no boundary conditions are available for the 3D model, i.e., the designers need not worry about specifying boundary conditions, either loads or constraints. This can facilitate adoption of generative design processes in product design workflows, as there is no need for the user of the computer-aided design software to be familiar with generative design, or simulation in general, since the user need not specify loads or displacement constraints for the 3D model (no computer aided engineering expertise is needed to setup a model of forces that act on the object represented by the 3D model). Thus, structural topology optimization can be performed without requiring the specification of any loads or constraints to perform topology optimization analyses.

The synthesized strain energy field (e.g., from the first three non-rigid eigenmodes and without any specified boundary conditions) can lead the shape advection to reasonable results by preventing over thinning on typical stress concentrated regions, and can be readily implemented in combination with a milling manufacturing filter that effectively produces manufacturable shapes. Further, frequency constraints can be enforced, without additional infrastructure. Moreover, the synthesized strain energy field is effective with other topology optimization constraints, such as additive manufacturing constraints, 2D cutting constraints, etc.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
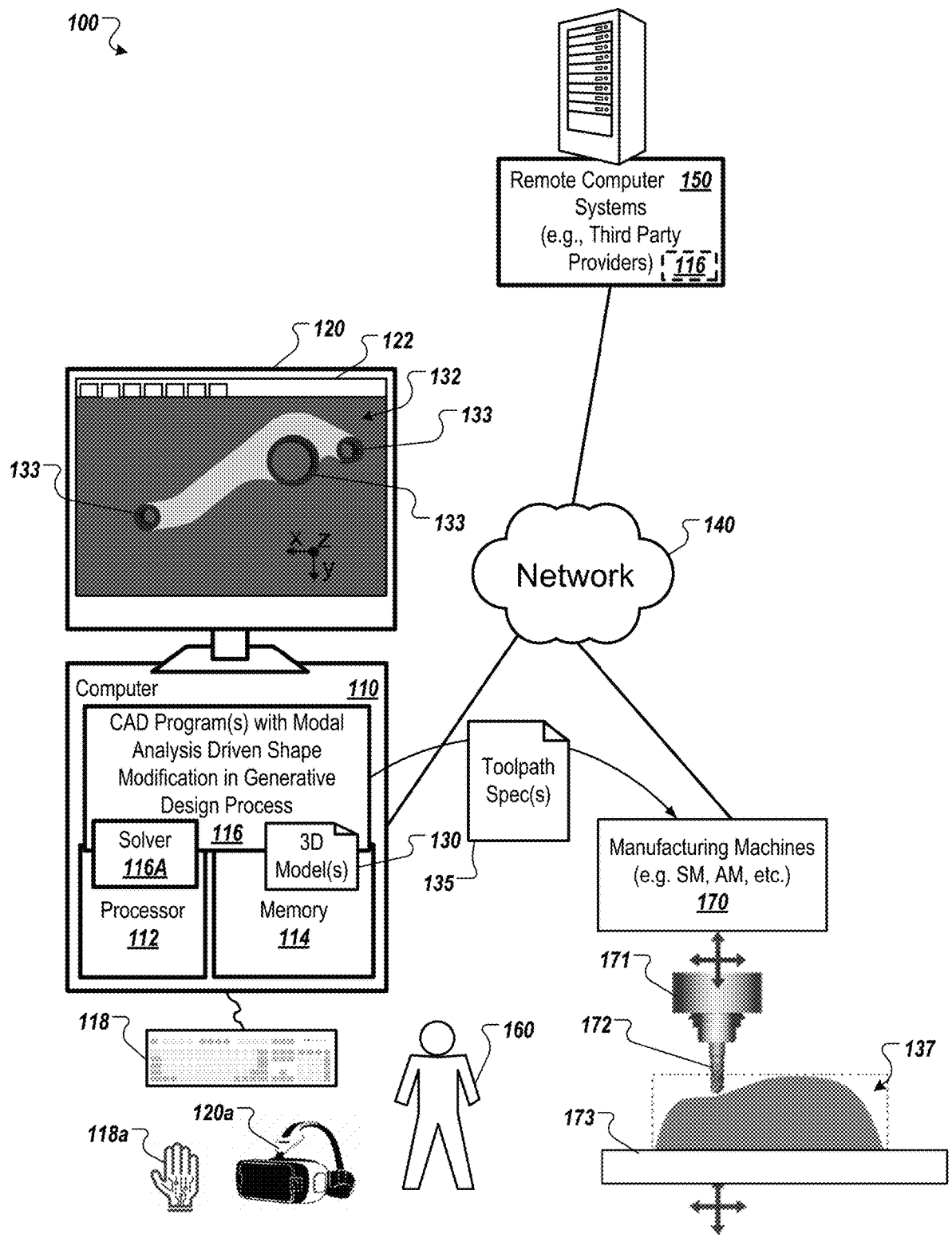
FIG. 1 shows an example of a system usable to drive shape modification in a generative design process using modal analysis.

FIG. 1 shows an example of a system 100 usable to drive shape modification in a generative design process using modal analysis. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and can include one or more generative design processes for shape optimization (e.g., using at least one levelset method with numerical simulation).

Generative design is a process where a designer or engineer can provide a set of requirements in terms of boundary conditions (e.g., structural loads and constraints), materials, one or more starting shapes, manufacturing constraints and other parameters, and the CAD program(s) 116 create various shapes that satisfy the requirements. The generative design process can employ algorithmic topology optimization to minimize at least one physical response of a shape represented in a three dimensional (3D) model of an object/part under different constraints, such as mass or stress. To enable the feedback loop of shape change while pursuing desirable structural performance, numerical simulation (e.g., the static analysis finite element simulation) of the physical behavior of the object/part is typically an essential step to perform. However, in some cases, while a user 160 of the CAD program(s) 116 may be very good at designing 3D models of objects/parts, this same user 160 may have very little computer-aided engineering experience and so have trouble specifying the boundary conditions.

This makes it difficult (if not impossible) for some users to gain the benefits of generative design processes because such users face significant challenges in preparing finite element model inputs (e.g., boundary conditions and/or mesh resolution settings) that are a key to obtaining meaningful results from generative design. To solve this problem, the systems and techniques described in this specification reduce the requirements of imposing correct boundary conditions, while still producing a physically feasible strain energy field to drive shape modification (e.g., levelset based topology optimization) during a generative design process. Moreover, as described in this specification, the present systems and techniques effect generative design processes that require much fewer computer processing resources since a numerical simulation of the physical response of the modeled object, with specified boundary conditions, need not be performed in each iteration of the shape optimization loop.

To generate a feasible strain energy field without having specified boundary conditions, one or more (e.g., at least three) non-zero eigen modal shapes of a finite element stiffness matrix for current (e.g., initial) geometric shape(s) in a 3D model can be used by the CAD program(s) 116 to derive a synthetic strain energy field, where this synthetic strain energy field can then be used to drive shape modification during the iterative loop in the generative design process. By superposing strain energy density fields from a few lower modal shapes, a feasible strain energy field can be generated from the modal shape. Note that, while the lower non-zero eigen modal shapes should generally be used, other non-zero eigen modal shapes can also be used, as described in further detail below in connection with frequency selective structural reinforcement. Also note that the derivation of the synthesized strain energy field only requires one or more initial shapes to start. This reduces the burden for non-expert users who would otherwise need to specify the correct boundary conditions to set up simulation for the generative design processes.

Other inputs that would typically need to be specified by the user 160 to run a generative design process can also be eliminated so as to automate the generative design workflow. For example, mesh resolution settings for levelset based topology optimization can be determined automatically by the CAD program(s) 116; the CAD program(s) 116 can provide minimum feature sizing, e.g., how thin or thick a given part is so that the mesh settings can be adjusted automatically, for example, 3 voxels through the minimum thickness. In some implementations, mesh resolution settings can be determined as follows.

For a lower bound, the resolution of grid can be determined by the minimum feature size of input 3D geometry, and the characteristic length of discretized grid or mesh should be small enough to capture the input geometry. Note that parametric CAD systems have full information of how the shape generated, which can be used to calculate the voxel resolution. For an upper bound, a trade-off can be used to meet the user experience goal in an interactive system. This limits the resolution to become too fine.

As another example, one or more default design criteria, such as a target volume or mass reduction constraint (e.g., a target of a fifty percent, forty percent or thirty percent reduction in shape volume) can be employed automatically when the user 160 does not specify any design criteria to guide the shape optimization. Note that, to lessen the burden, exact mechanical material properties (Young's modulus and Poisson's ratio) need not be required, as long the material can be presumed to be isotropic. Further, the user need not specify the material density.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

An initial 3D model 132 (e.g., loaded from a file or created in the CAD program 116 by the user 160) is provided as input for a generative design process. The initial 3D model can include one or more preserve bodies 133 (keep-ins) and potentially one or more obstacle bodies (keep-outs). The preserve bodies 133 can be fixed (physically constrained) and/or free (not physically constrained). A design space for the generative design process can be the initial model 132 or be determined as a bounding volume or a convex hull of the input model 132. The design space is the volume of space inside which the part is to be generatively designed during shape modification.

The shape modification can involve pure shape optimization and/or topology optimization of the geometric design of the 3D model(s) by the CAD program(s) 116. Topology optimization is a method of light-weighting where the optimum distribution of material is determined by minimizing an objective function subject to design constraints, e.g., structural compliance with volume as a constraint; thus, lightweight organic forms for 3D models can be produced without reducing the strength of the manufactured part. There are two primary categories of topology optimization, density-based approaches and boundary-based approaches. Density-based approaches (e.g., Solid Isotropic Material with Penalization (SIMP) or homogenized methods) discretize the volume of the part into individual elements, assign a density to each discrete element, and then the densities are driven toward solid and empty while minimizing the objective(s) subject to the constraints. Boundary-based approaches instead track the shape of the external interface of the solid part and move the boundary such that the constraints are satisfied and the objective(s) are minimized, such as in a level-set method. Note that, as used herein, "optimization" (or "optimum" or "optimizer") does not mean that the best of all possible designs is achieved in all cases, but rather, that a best (or near to best) design is selected from a finite set of possible designs that can be generated, e.g., within an allotted time given the available processing resources and/or in view of competing objectives for the optimization process.

In any case, the CAD program(s) 116 use modal analysis to drive shape modification of the 3D model 132 in at least one generative design process, as described in further detail below. The modal analysis allows the CAD program(s) 116 to find a plausible modified energy field for a given geometry using an analysis of the eigenvalues of a finite element stiffness matrix. Thus, designers need not worry about specifying one or more boundary conditions for numerical simulation, e.g., a loading condition and a displacement constraint for use in various types of physics simulations, which can be used during generative design processes.

Note that an incorrectly defined boundary condition can lead to unexpected outcomes (and thus wastes of time and effort) in generative design when used in the finite element simulation analysis that drives shape change during regular generative design processes, which embeds simulation results as it updates the geometry. Detecting errors in boundary condition definitions becomes the user's burden, and the user may struggle to apply the correct boundary conditions and consequently to obtain meaningful results. In fact, applying the proper boundary condition requires domain-specific knowledge on solid mechanics and finite element analysis (FEA), and many CAD users lack those skills. The key ingredient for accurate FEA simulations, and a common source of error, is the definition of boundary conditions. Even seasoned computer-aided engineering (CAE) experts can make mistakes with simple models.

As noted above, default design criteria can be used, and so in some implementations, the user 160 can run a generative design process to modify the shape (e.g., modify both a geometry of the generatively designed shape and a topology of the generatively designed shape) without providing any input beyond an initial 3D model 132 of a part/object. Thus, both the difficulties and the errors associated with novice CAE users and/or CAD users (who may have trouble figuring out where to apply a load when defining a boundary condition) are alleviated, enabling generative design and its associated structural simulation to be leveraged by users without them having to learn new concepts related to CAE or simulation. However, while the CAD program(s) 116 can perform a generative design process without any input regarding boundary conditions for the 3D model of an object to be generatively designed, the functionality of the CAD program(s) 116 need not be limited to this case, and if the user can provide the constraints or loads, the results can be enhanced while still using the modal analysis results as described in this specification.

Thus, in some implementations, the CAD program(s) 116 still enable the specification of boundary conditions for the 3D model 132, and these boundary conditions can be used to enhance the shape modification performed using the strain energy information synthesized from the modal analysis. The CAD program(s) 116 can also accept specification of design criteria, e.g., by the user 160 and/or by importing from another source. One or more of the design criteria can be defined over entire regions in the design space or over individual regions in the design space.

The design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use; assemblies with linear contact can be supported by the CAD software). In some implementations, boundary condition(s) can be imported for use in the generative design process, such as when a user selects a part in an assembly for topology optimization, and a boundary condition defined by the assembly model, which includes the selected part model, can be readily retrieved. Moreover, the design criteria can include manufacturing constraints, e.g., for 2.5-axis, 3-axis or multi-axis Computer Numerical Control (CNC) machines.

In general, design criteria can include design objective(s) and design constraint(s) for the object. Design objectives can include but are not limited to minimizing waste material, minimizing the weight of the part, and minimizing the compliance, stress, or other intrinsic property of the part; design objectives are used to drive the shape synthesis process towards better designs. Though not required, it is typical for a design objective to be rooted in a simulation of the design, e.g., linear static, fluid dynamic, electromagnetic, etc. Design constraints can include a variety of geometric and physical characteristics or behaviors that should be met in any generated design (requirements either on individual parts or on the entire assembly are also admissible); examples include maximum mass, maximum deflection under load, maximum stress, etc.

Moreover, the CAD program(s) 116 can employ various types of numerical simulation techniques to simulate one or more physical properties and produce a numerical assessment of physical response (e.g., structural response) of the modelled object. For example, finite element analysis (FEA), including linear static FEA, finite difference method(s), and material point method(s) can be used. Further, the simulation of physical properties can also include Computational Fluid Dynamics (CFD), Acoustics/Noise Control, thermal conduction, computational injection molding, electric or electro-magnetic flux, material solidification (which is useful for phase changes in molding processes)

simulations, linear transient dynamic analysis, normal mode analysis, buckling analysis, and/or heat transfer analysis.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or numerical simulation operations) "to the cloud" by having one or more programs 116 on one or more computers 150 perform the offloaded processing operations.

In some implementations, numerical simulation is performed in a distinct solver program 116A, e.g., a general purpose Finite Element solver, which can be integrated into CAD program 116 or shared among multiple programs, including CAD program 116. Thus, the solver program 116A can run in the cloud on one or more computers 150. Moreover, in some implementations, the generative design program(s) can be run in the cloud from an API (Application Program Interface) that is called by a program, without user input through a graphical user interface.

However, as noted above, when numerical simulation of physical response is not used in the shape optimization loop (because of the use of the systems and techniques described in this specification) then much less processing operations are needed. In these cases, the run time of the generative process can be a few minutes or less on a typical personal computer. Thus, the generative design process is very light weight in terms of processing load intensity, and the generative design process can be run entirely on the local computer 110 (the CAD client system) without the use of cloud-computing resources. Further improvements in the use of processing resources can be achieved based on the selection of the eigen-solver (e.g., leveraging a pre-conditioned conjugate gradient eigen-solver) and the shape/topology optimizer.

In any case, the user 160 can be enabled by the CAD program(s) 116 to change one or more of the design criteria (and optionally define and redefine the problem setup) and run the generative design process multiple times. Once the user 160 is satisfied with a generatively designed 3D model, the 3D model can be stored as a 3D model document 130 and/or used to generate another representation of the model (e.g., toolpath specifications for a manufacturing system). This can be done upon request by the user 160, or in light of the user's request for another action, such as sending the generatively designed 3D model document 130 to one or more computer-controlled manufacturing systems 170, e.g., a subtractive manufacturing (SM) machine 170 or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model document 130 for later use. For example, the CAD program(s) 116 can store or send the document 130 that includes the generated 3D model 132.

The CAD program(s) 116 can provide a document 135 (having toolpath specifications of an appropriate format) to the one or more computer-controlled manufacturing systems 170 to build a structure corresponding to the 3D model, e.g., to SM machine 170 to create a complete structure from stock material 137. An SM machine 170 can employ one or more subtractive manufacturing techniques, e.g., a CNC milling machine, such as a multi-axis, multi-tool milling machine. The SM machine 170 can be a 3-axis CNC machine, where the spindle 171 and attached tool 172 (e.g., a rotary cutter or router selected from a set of available tools) has full freedom of movement in each of the x, y and z dimensions, i.e., the tool 172 can move in all three axes simultaneously, or the SM machine 170 can be a multi-axis machine, where the tool 172 can translate in three axes (x, y, z) and rotate in two axes (roll and yaw) simultaneously while cutting a workpiece 137. Note that these additional freedoms of movement can be effected by computer controlled motion of the spindle 171, computer controlled motion of a clamp or anchor point (e.g., machine table) 173 for the part being machined, or both in combination. In addition, rather than (or in addition to) using an SM machine 170, the machine 170 can be an additive manufacturing (AM) machine 170 or other manufacturing machinery, e.g., machinery for casting and forging (both hot and cold).

Figure 2A:
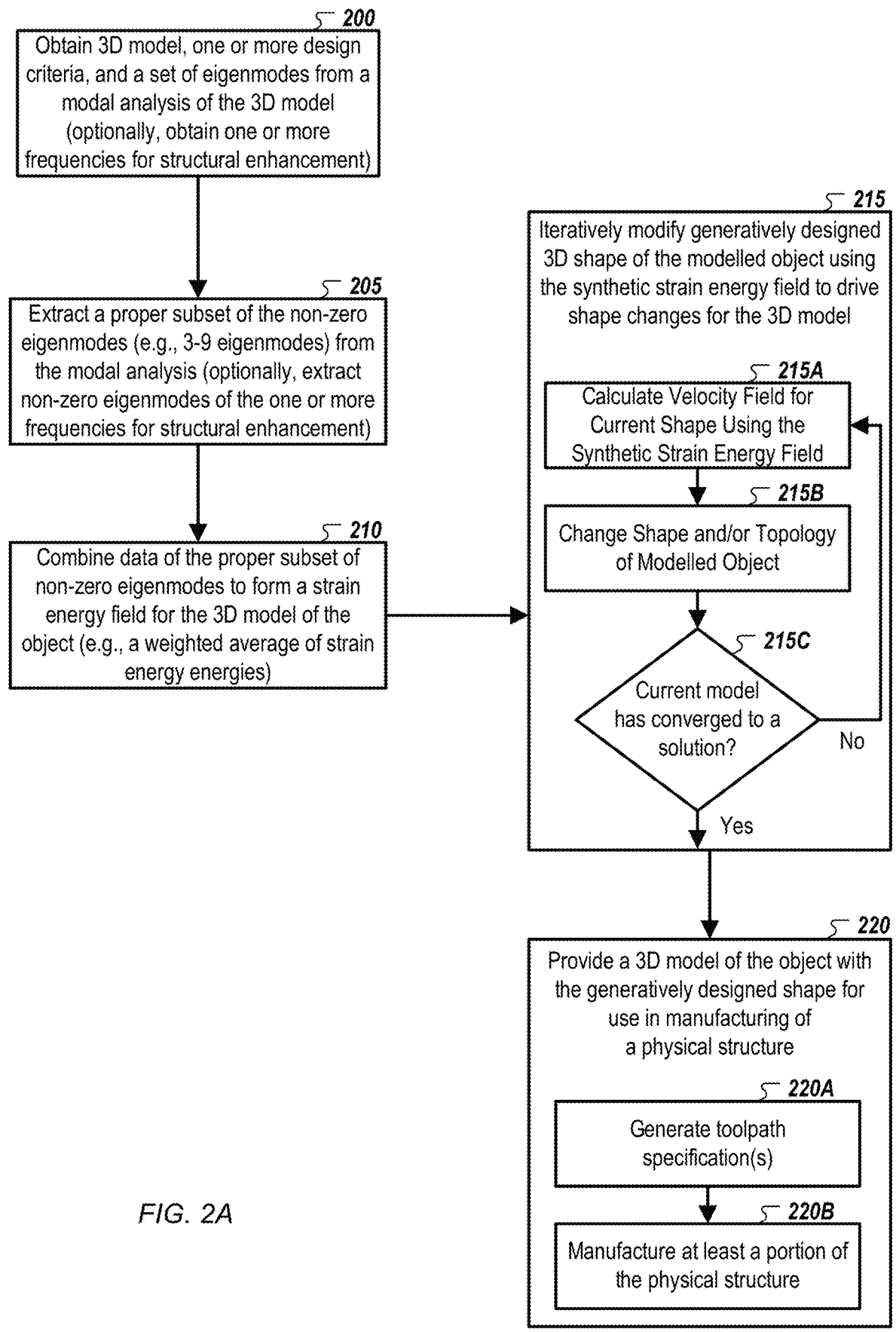
FIG. 2A shows an example of a generative design process that uses modal analysis to drive shape optimization.

FIG. 2A shows an example of a generative design process that uses modal analysis to drive shape optimization. One or more design criteria, a 3D model of an object for which a corresponding physical structure is to be manufactured, and a set of eigenmodes from a modal analysis of the three dimensional model of the object are obtained 200, e.g., by CAD program(s) 116. The one or more design criteria can include default(s) that are used automatically when a user does not specify any design criteria. For example, obtaining 200 the design criteria can include loading a default target volume reduction of fifty percent or less (e.g., a design objective for the generative design process of reducing the volume of the 3D model by 50%, 40%, 30%, 20%, or 10%). Note that this facilitates the adoption of generative design processes in CAD workflows in that the user need provide no information whatsoever regarding the goals of the generative design process, but rather simply clicks a single button to initiate a generative design process for a 3D model of an object.

Nonetheless, the obtaining 200 can also include receiving user input defining specific design criteria. As noted above, design criteria can include design objective(s) and design constraint(s) for the object. Design objectives can include but are not limited to minimizing waste material, minimizing weight of the part, minimizing compliance or maximizing stiffness, minimizing stress, and/or minimizing or maximizing other intrinsic properties of the part, and are used to drive the shape synthesis process towards better designs. Note that the typical objective used in topology optimization (where the objective is minimized by adding/removing material based on given constraint conditions) is compliance or a form of compliance (like strain energy), and the optimization constraints typically restrict the addition/removal of material and also the regions inside the model where the material can be added or removed.

Design constraints can include a variety of geometric and physical characteristics or behaviors that should be met in any generated design. The design constraints can include one or more manufacturing constraints, which can be specific to manufacturing methods that are to be used in the fabrication of the parts/models, such as 3D printing, milling and die-casting. For example, the manufacturing constraint can be a build angle constraint for an additive manufacturing process and/or a tool access constraint for a subtractive manufacturing process. Further, the objectives and constraints can be specified using known user interfaces. Thus, even though the generative design process workflow is simplified for the less experienced user, the more experienced user can still be provided access to the various complex control inputs that can then help to drive the generative design process.

Obtaining 200 the 3D model of the object can include loading the 3D model from a computer-readable medium and/or receiving user input, e.g., via CAD program(s) 116, that creates the 3D model. In any case, the 3D model defines the design space for the generative design process. This design space is the volume inside which the part is to be designed. At a minimum, the design space is a bounding volume of the 3D model, which serves as a sub-space of an optimization domain of the generative design process. Note that the outer shapes of the 3D model need not all be connected. For example, as shown in FIG. 1, rather than starting with the 3D model 132, the initial 3D model can simply be unconnected preserve bodies 133, e.g., B-Reps selected using UI 122 to specify sub-space(s) that are preserved for use as connection point(s) with other component(s) in a larger 3D model, and the obtaining 200 can then involve generating a convex hull of the preserve bodies 133 to form the input 3D model for the generative design process. Thus, the process can be employed by the user to generate entirely new geometry in the 3D model for the object.

Finally, the obtaining 200 includes obtaining a set of eigenmodes from a modal analysis of the input 3D model of the object. This can involve performing, e.g., by CAD program(s) 116, the modal analysis (computation of normal modes) directly, or calling a separate program. Note that modal analysis of 3D models constitutes existing process(es) used to enable optimization of the natural frequencies of a structure or to satisfy a modal constraint, e.g. the natural frequency of the structure must be larger than a minimum value. The traditional modal analysis process need not be modified to generate modal analysis results that are usable by the systems and techniques of the present disclosure. Thus, an off-the-shelf modal analysis program can be used to generate the set of eigenmodes for the 3D model used as input for a generative design process. Moreover, the modal analysis can be performed with or without any structural loads or constraints having been specified for the 3D model.

The following description includes extraction 205 of eigenmodes. However, in some implementations, only the eigenmodes that are desired are generated from an input 3D model, and so no extraction 205 is needed. If pre-selected eigenmodes are available, the strain energy field can be directly synthesized out of them. For example, if FE modal analysis is run, the modes to reinforce the structure against are selected—knowing which modes are important or not.

A proper subset of non-zero eigenmodes (or equivalently, eigenmodes with non-zero eigenvalues) can be extracted 205, e.g., by CAD program(s) 116, from the set of eigenmodes from the modal analysis. Each of the extracted eigenmodes is a non-zero eigenmode. In addition, in some implementations, the proper subset includes at least three eigenmodes from the set of eigenmodes. Additional eigenmodes can be extracted 205, such that the proper subset includes 3, 4, 5, 6, 7, 8, or even 9 eigenmodes. In most cases, using data from 3 or 4 of the lowest valued eigenmodes is sufficient to capture sufficient information about the shape of the 3D model to characterize a static strain energy field for the structure.

In some cases, more eigenmodes can be used, but since processing more eigenmodes increases run time, the number of eigenmodes to use can be selected based on the processing speed(s) of the computer(s) and the desired upper limit for the processing time to complete the generative design (e.g., in accordance with an estimate of the run time needed for a range of eigenvalue extraction options for a generative design process to be run entirely on the local computer versus being run partially or fully in the cloud). The number of eigenmodes in the subset can be varied across implementations or within a given implementation; the number of eigenmodes to be used can be tuned based on the desired run time (e.g., as specified by the user) for the generative design process. Moreover, while in general the lowest valued eigenmodes should be extracted, some lower valued eigenmodes can be skipped while extracting 205 higher valued eigenmode(s) in some implementations, such as for frequency selective structural reinforcement, which is described further below.

The eigenvalues and eigenvectors of stiffness matrix can have several meanings.

In the geometrical interpretation, the stiffness matrix of finite element [K] maps a displacement vector $\{d\}$ to a force vector $\{p\}$. If the arbitrary vector and $[K]\{x\}$ point in the same direction, then the vector $\{x\}$ is the eigenvector of [K]. The ratio of the Euclidean norm of vector $[K]\{x\}$ to the norm of vector $\{x\}$ is the eigenvalue $\lambda$ of [K] associated with the eigenvector $\{x\}$. The canonical form of the eigenvalue problem can be written:

$$[K]\{x\}=\lambda\{x\} \tag{1}$$

The principal axis directions of the force-ellipsoid are the eigenvectors of [K], and the lengths of these principal axis directions are the eigenvalues of [K]. The geometric property can translate in the mechanics as if the displacement aligns with modal shape, and so it will get amplified as much as the eigenvalue. Note that the mass matrices are not needed, as the goal is a static analysis of likely strain energy for the structure, rather than dynamical analysis of how the structure responds transiently; the eigenvalue property can be extracted from the stiffness matrix itself, which has information about the geometric distribution of the shape.

Since the stiffness matrices of finite element are symmetric, all its eigenvalues are real-valued. If a structure is internally and externally stable, then its stiffness matrix is invertible. Otherwise, the structure under any load will exhibit rigid body motions without deformation, or mathematically, the structure will exhibit infinite displacements. If all the eigenvalues of the matrix are positive, the matrix is positive definite. This means that the positive definite [K] guarantees any set of displacements will result in positive strain energy, $$U=\tfrac{1}{2}\{d\}^T[K]\{d\}>0 \,\forall\,\{d\}\neq 0 \Leftrightarrow \lambda_i>0 \,\forall\, i. \tag{2}$$

The above equation implies that eigenvalues and associated eigenvectors can be interpreted respectively in the strain energy and its displacement mode. Thus, an admissible strain energy density field can be synthesized from modal shape for the 3D model of the object because eigenmodes from the modal analysis indicate which portions of the structure being modeled are most vulnerable to deformation, i.e., easier to deflect.

Figure 2B:
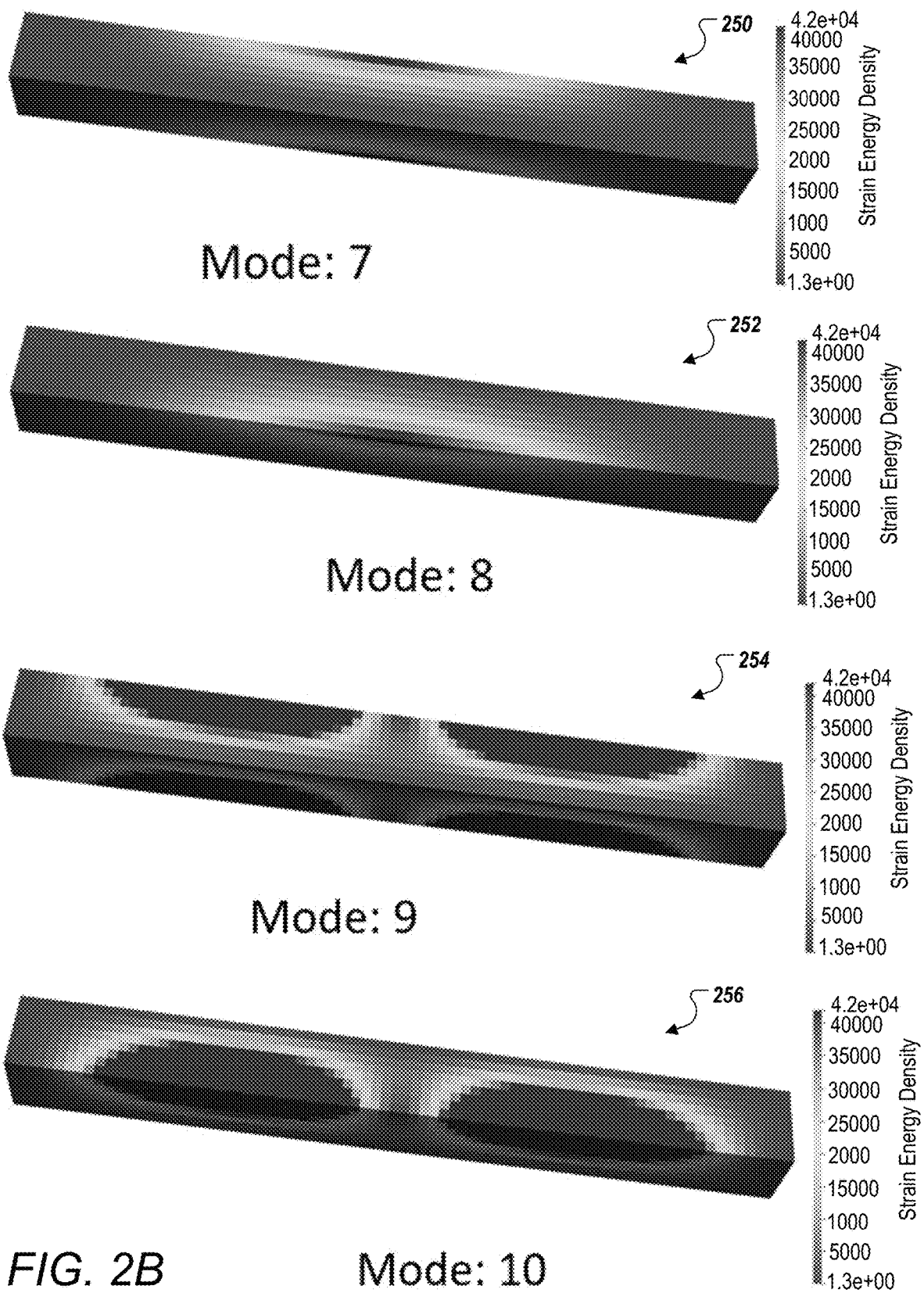
FIG. 2B shows examples of non-rigid body eigenmodes of a simple prismatic beam.

In the same line of reasoning, the smallest non-zero eigenvalue of the structural stiffness matrix represents the smallest required strain energy to deform the structure into the corresponding eigenvector or modal shape. Based on these physical meanings, eigenvectors can be graphically visualized in displacement modes that generate the deformation energy associated with the associated eigenvalues, as shown in FIG. 2B, which shows examples 250, 252, 254, 256 (modes 7, 8, 9 and 10) of non-rigid body eigenmodes of a simple prismatic beam. Note that the specific values in FIG. 2B are not important, as this is simply showing fictitious synthetic energy from the un-normalized eigenvectors as the form of displacement for ease of presentation. The set of eigenvalues and associated eigenvectors is called an "eigenmode". The 3D model has as many unique modes as the number free degrees of freedom in the system, e.g., for a structure with 1,000 degrees of freedom there will be 1,000 eigenmodes. Note that the eigenmodes can be determined regardless of whether or not the 3D model has associated boundary constraints, and analysis of the eigenvalue structure of a stiffness matrix reveals that each eigenvalue corresponds to the strain energy to deform the shape in that eigenmode; the "frequency" of an eigenmode corresponds to the strain energy of shape deformation due to the modal characteristic of stiffness.

In addition to the element attributes assigned to the model, integration rules can also be reflected in the unique modes shown in FIG. 2B. This can be interpreted to mean that, in the eigenproblem of the stiffness matrix, the modes with the lower eigenvalues correspond to the modes where shape deformation is most likely under arbitrary loads to a given geometry since the eigenvalue corresponds to energy. Lower energy for the eigenvalue means less force is needed to cause deformation in that deformation mode, and so the eigenvectors of lower valued eigenmodes are the displacement field of the most likely locations of the 3D model to get deformed. Thus, the elastic energy of deformation from the superposition of several eigenmodes with the smallest eigenvalues indicate a plausible deformation energy in the system of the 3D model.

Returning to FIG. 2A, note that the extraction 205 of modal deformation information can be done from a conventional structural modal FEM from an off-the-shelf modal analysis program. Also, if density information (and thus mass information) is available (e.g., from the user) this information can be used. The general form of the eigenvalue problem is more generic than the eigenvalue problem of stiffness (spring constant) only:

$$[K]\{x\}=\lambda[M]\{x\} \quad (3)$$

where [M] is typically a lumped mass matrix. If one considers the system with all nodal points having equal amounts of point mass, [M]=c[I], then the equation becomes the same eigenvalue form of the stiffness only. This approach has many benefits due to the ability to access the well-established sparse matrix eigenvalue extraction scheme.

In any case, data of the proper subset of non-zero eigenmodes are combined 210, e.g., by CAD program(s) 116, to form a strain energy field for the 3D model of the object. This can involve normalizing and regularizing (and potentially weighting) the strain energy density from all modes being superposed. Considering a set of displacement vectors consistent with the structural constraints of the structure, for a given stiffness matrix, $\{p\}=[K]\{d\}$, will produce a corresponding set of force vectors (in equilibrium). For each displacement vector, there is one, and only one, force vector. Consider a sphere-like set of displacement vectors {d}, $$d_1^2+d_2^2+ \ldots +d_N^2=1. \quad (4)$$

If N=2, then the trips of the {d} vectors trace out a unit circle. A circular set of {d} vectors produces an ellipsoidal set of {p} vectors. This ellipsoid represents the principal axes with corresponding length.

$$[K] = \begin{bmatrix} 2 & 1 \\ 1 & 2 \end{bmatrix}, \lambda_1 = 1, \lambda_2 = 3 \quad (5)$$

The two dimensional spheroidal set of {d} vectors produces an ellipsoidal set of {p} vectors for stiffness matrix for [2, 1; 1, 2].

The stiffness matrix of a non-stable structure will have a zero eigenvalue; unstable structures can be moved to a displaced condition without zero force, i.e., $[K]\{d\}=\{0\}$, and so the stiffness matrix is singular. In the stable structure, the invertible stiffness matrix satisfies $\det([K])\neq 0$ and this implies that no eigenvalues can be zero in the non-rigid body deflection. This is due to the determinant of the matrix being the product of its eigenvalues, $$\det([K])=\lambda_1 \cdot \lambda_2 \ldots \lambda_n. \quad (6)$$

Note again that using eigenvalue analysis of the stiffness matrix from modal analysis to form the strain energy field means no structural constraints (nor loads) are needed to run (free-free) the generative design process, and the resulting generative design process is numerically stable and fast. Further, since each eigenmode is orthogonal to the others, the deformation energy field can be synthesized from a number of the first few non-rigid body eigenmodes (the first few non-zero eigenvalues).

In some implementations, the combining 210 includes making 210 the strain energy field equal to a sum of equally weighted strain energies of the proper subset of non-zero eigenmodes (e.g., weighting the strain energy density from the modes equally in the final strain energy field used for advection in level-set based shape generation). The summation of a few eigenmodes from the lowest non-zero eigenmodes can be interpreted as the most likely deformation modes of the structure while in use, and equally weighting the different deformation modes provides a balanced approach. In some implementations, the combining 210 includes defining 210 the strain energy field as a weighted average of strain energies of the less than ten eigenmodes, where a weight for each eigenmode is inversely proportional to the eigenvalue of the eigenmode. Modifying the resulting strain energy by a weighted average, where each weight is inversely proportional to the eigenvalue of each eigenmode, can facilitate building the synthetic strain energy field from a wider eigenvalue range.

Figure 2C:
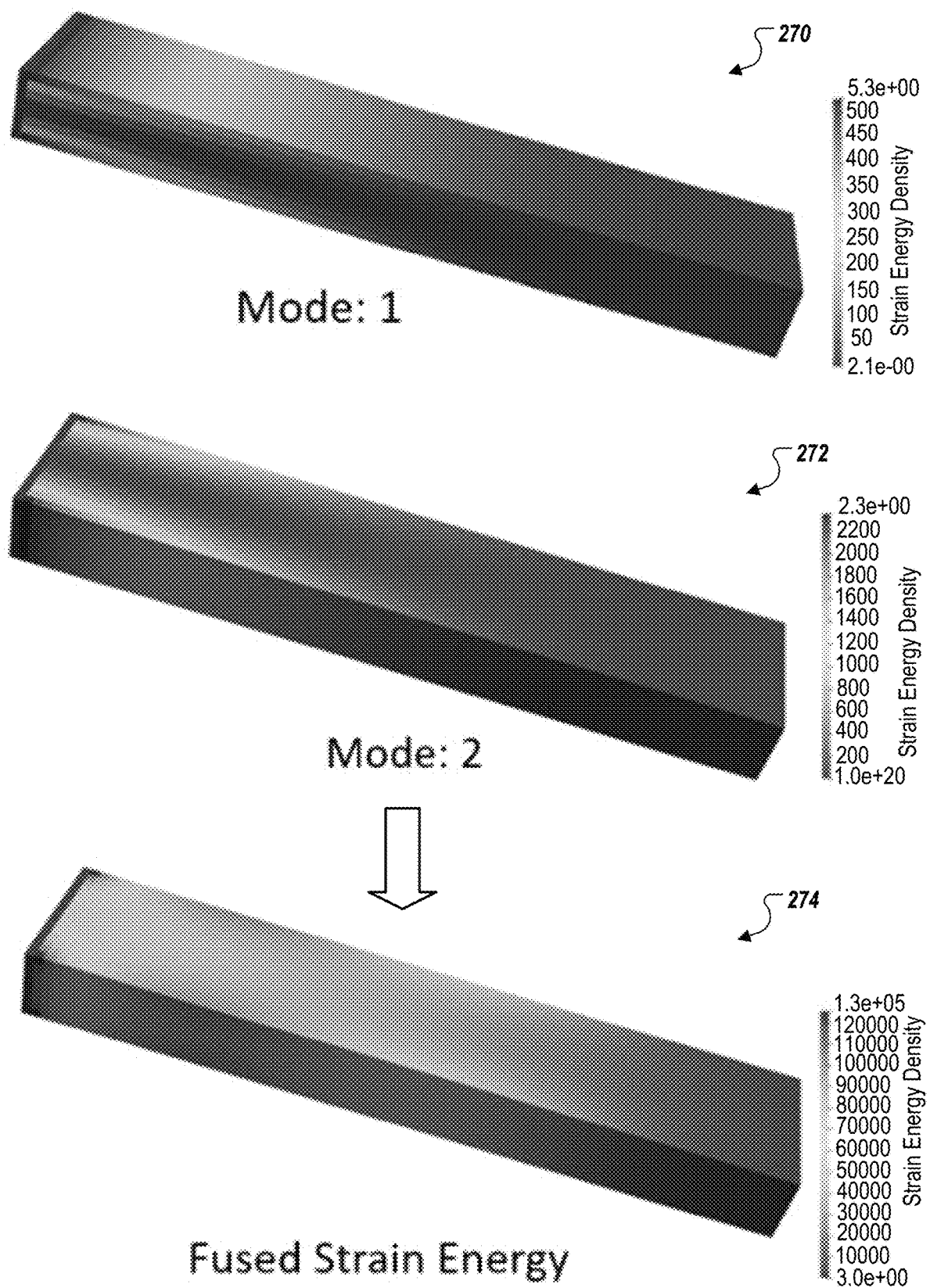
FIG. 2C shows an example of superposing relevant low eigenmodes to synthesize an admissible strain energy field.

Further, the inverse weighting means higher frequency eigenvalues will have less participation in the strain energy used in the optimization, which is consistent with the expected behavior when the structure is in use, where low frequency modes will have the most influence in the response. FIG. 2C shows an example of superposing relevant low eigenmodes 270, 272 (modes 1 and 2) to synthesize an admissible strain energy field 274 (the fused strain energy). In general, the lower frequency modes should have more impact when superposing the eigenmodes to synthesize a strain energy field that fuses structural information from the separate eigenmodes provided by the modal analysis, but the user can be provided control over the weighting process in order to favor some eigenmodes over others in the shape optimization. The user can be provided a UI to enable selection of one of various options for how to combine 210 the data of the different non-zero eigenmodes to form the strain energy field. In some cases, the user doesn't care about the force amount and wants to focus instead on how loading forces traverse the structure, which leads to equal weighting of the eigenmodes. In other cases, the user does care about the applied forces and so can provide different weightings, e.g., weighing certain keep-ins and keep-outs more than others, through the UI.

In addition, the weighted averaging 210 of the strain energies represented by the different eigenmodes can take other objectives into account, such as frequency selective structural reinforcement. In implementations that enable frequency selective structural reinforcement, the obtaining 200 can include obtaining (e.g., from the user) one or more frequencies of vibration for which structural performance of the physical structure to be built from the modeled object is to be enhanced. For example, a UI 122 of the CAD program(s) 116 can enable the user to select a specific frequency, a set of frequencies, or a range of frequencies, to be used in driving the generative design process toward a solution that modifies the geometry (and potentially also the topology) of the 3D model in a manner that improves the physical, structural performance of the manufactured object. Then, the extracting 205 includes extracting 205 from the set of eigenmodes (in the modal analysis results) one or more non-zero eigenmodes that correspond to the one or more frequencies of vibration, e.g., extract the eigenmodes with resonate frequencies that fall within the frequency range or that are within a tolerance band around a specific frequency specified by the user. Finally, the combining 210 includes defining 210 the strain energy field as a weighted average of strain energies of the proper subset of non-zero eigenmodes.

Doing structural reinforcement on one or more working frequencies can improve the strength and usability of the structure manufactured from the 3D model that is generatively designed using the systems and techniques described in this specification, even when no boundary conditions are provided. The modal shape {x} can be extracted as either $$K\{x\}=\lambda\{x\} \quad (7)$$

or $$K\{x\}=\lambda[M]\{x\} \quad (8)$$

If consistent mass [M] is used in the eigenvalue computation, the eigenvalue $\lambda$ is $\omega^2$, where $\omega$ is the natural frequency of vibration. Using this property, the structural performance of the generative design outcome can be selectively enhanced. For example, for a part used in a dynamic working condition with known working loading frequencies, e.g., a connecting rod of an engine, modal shapes with the consistent mass can be computed, and the corresponding frequencies can be targeted for reinforcement.

Structural enhancement/reinforcement can be done across a user selected frequency range, as noted above. The modes that are close to a frequency range of interest can be picked to be enhanced. In any case, the strain energy fields of the corresponding modes can be included and weighted in the synthetic strain energy field to be used with shape optimization during the generative design process to provide frequency selective structural reinforcement.

The one or more design criteria are used in the process of iteratively modifying 215, e.g., by CAD program(s) 116, the 3D shape of the modeled object in the design space to generatively design the physical structure. This can involve modifying both a geometry of the three dimensional shape and a topology of the three dimensional shape in the design space in accordance with the one or more design criteria. As used herein, the "geometry" of the three dimensional shape is the representation of the individual shape elements being deformed during modification, and the "topology" of the three dimensional shape is how the shape elements are bounded and connected in the 3D model (modifying the topology involves adding holes or voids to modify the spatial properties of the surface that are unaffected by continuous deformation without tearing, thus changing how shape elements are bounded and connected in the 3D model).

But it is to be noted that no physical response of the modeled object need be determined using numerical simulation techniques during the iterative modifying 215. This is because an approximation of that physical response is provided by the strain energy field that has been synthesized from the subset of results of the modal analysis. Thus, there is no need to perform numerical simulation to compute an actual strain energy field in each iteration of the modifying 215.

In the conventional levelset method, the evolution of the level set function is achieved by solving the following Hamilton-Jacobi partial differential equation (PDE):

$$\frac{\partial \Phi}{\partial t} - V_n|\nabla\Phi| = 0, \; V_n = V\cdot\left(-\frac{\nabla\Phi}{|\nabla\Phi|}\right) = V_n(x,\,t) \quad (9)$$

where $V_n$ is the normal velocity and depends on the shape derivative of the objective of an optimization problem. However, several numerical difficulties can be encountered when using the conventional levelset topology optimization method, such as the upwind differencing scheme, the re-initialization of the levelset function, the limitation of time step size to satisfy the Courant-Friedrichs-Lewy (CFL) condition for numerical stability, and the generation of new holes in the solid material domain.

In the context of structural topology optimization, the advection velocity field is related to the shape derivative which minimizes the compliance of a given structure under loading. The compliance $\Psi$ of structural static problem on the given domain $\Omega$ can be written as:

$$\Psi(\Omega,u)=\int_\Omega f\cdot u d\Omega+\int_{\Gamma_n} t\cdot u d\Gamma = \tfrac{1}{2}\int_\Omega D\varepsilon(u):\varepsilon(u)d\Omega \quad (10)$$

Evaluating the shape derivative requires the directional derivative of the state variable u in the direction of the velocity vector $\delta v$. It can be assumed that some boundary variations are not relevant in practical shape optimization. In solid mechanics, the variations are zero on the Dirichlet boundary or Neumann boundary condition applied regions. So, using the perturbation of functional, the shape derivate with respect to compliance becomes:

$$\delta v = (2f\cdot u - D\varepsilon(u):\varepsilon(u)). \quad (11)$$

The optimization of engineering products means minimizing the cost of production, and this lead to enforcing volume constraint(s) along with a compliance minimization objective function. Considering a modified objective function where the volume is penalized by a penalty factor, $\mu$:

$$J(\Omega,u)=\tfrac{1}{2}\int_\Omega(D\varepsilon(u):\varepsilon(u)+\mu V(\Omega))d\Omega \quad (12)$$

Since the $\mu$ is constant along the boundary of the 3D shape, the velocity term in the shape derivative becomes as follows:

$$\delta v = (2f \cdot u - D \in (u) : \in (u) + \mu) \quad (13)$$

This equation indicates the value of driving structural topology optimization with any admissible strain energy field of $D\in(u):\in(u)$ with a given displacement field, u.

Returning to FIG. 2A, the iterative modification 215 uses the synthetic strain energy field (derived from the modal analysis) to drive changes to the generatively designed shape of the 3D model. This results in a dramatic reduction in the number of computations needed to perform a generative design process. In other words, the iterative modifying 215 need not perform FEA to calculate a velocity field. Rather, the modifying 215 can include calculating 215A a velocity field for the current shape using the synthetic strain energy field, changing 215B the shape and/or topology of the modeled object using the velocity field, and continuing to modify the 3D model until the current 3D model has converged 215C to a stable solution (or until a predefined number of iterations have been completed). In some implementations, the modal analysis and the combining of data from extracted eigenmodes can be included in the iterative loop that changes the shape of the 3D model; this can still improve performance since the numerical eigenanalysis of the FEA stiffness matrix is less computationally expensive than solving multiple load cases of a linear system equations. Nonetheless, doing this numerical eigenanalysis in the iterative loop can still take up a major portion of the computing time during a structural topology optimization.

Thus, in some implementations, the numerical eigenanalysis is done outside of the iterative loop, as shown in FIG. 2A. This means that the calculated 215A velocity field will become less appropriate with each iteration because the synthetic strain energy field will not change along with the changing shape of the 3D model in each iteration. Nonetheless, the velocity field will be good enough to generate usable results. Further, the issue of decreasing accuracy of the approximation across iterations can be mostly eliminated by using more than one stage of iterative modification 215, as described in further detail below in connection with FIG. 3.

Moreover, even though no numerical simulation is needed, in some implementations, the modifying 215 does include at least some numerical simulation to determine at least one aspect of the physical response of the modeled object. Thus, the calculating 215A can include performing numerical simulation (e.g., FEA structural simulation) in one or more iterations of the generative design process to help drive the shape modification based on a boundary condition specification (e.g., a structural load, a structural constraint, or both) for the 3D model of the object; feedback from structural simulation performed on the current shape helps to drive shape modification 215 in addition to the synthetic strain energy field from the modal analysis. This can involve separately processing a strain energy field from the numerical simulation, modifying the synthetic strain energy field based on the results of the numerical simulation, or modifying a strain energy field from the numerical simulation using the synthetic strain energy field.

Regardless of whether or not numerical simulation is used in the generative processing, in some implementations, the result of generative design processing is presented to the user, e.g., in UI 122 on display device 120, along with an option to accept or reject the design. In some implementations, the user can select from the final design or any of a variety of previous or current iterations for each design study, e.g., multiple generative design processes run concurrently using different target volume reduction objectives.

In some implementations, two or more 3D models resulting from the generative design process can be presented to the user along with a trade-off analysis of design complexity versus cost of manufacturing (or any of a variety of other quantities of interest). The trade-off analysis can assist a user 160 in deciding whether to accept or reject one or more 3D models among the presented 3D models. Note that the user can explore simultaneously-generated, multiple solutions with various performance, cost, choice of material, and manufacturing requirements.

Once a design is not rejected, the process can provide 220, e.g., by CAD program(s) 116, the 3D model of the object with the generatively designed shape (potentially after some post-processing of the generative design output, such as conversion into a watertight B-Rep 3D model) for use in manufacturing of the physical structure of the design. The providing 220 can involve sending or saving the 3D model to a permanent storage device for use in manufacturing the physical structure corresponding to the object using AM and/or SM manufacturing systems. In some implementations, the providing 220 involves generating 220A, e.g., by CAD program(s) 116, toolpath specifications for computer-controlled manufacturing system(s) using the 3D model, and manufacturing 220B, e.g., by CAD program(s) 116, at least a portion of the physical structure corresponding to the object with the computer-controlled manufacturing system(s) using the toolpath specifications generated for the computer-controlled manufacturing system(s). In some implementations, the providing 220 can include manufacturing a mold for a physical structure using the toolpath specification generated 220A, where the 3D model can be a model of the mold that will be manufactured.

Figure 3:
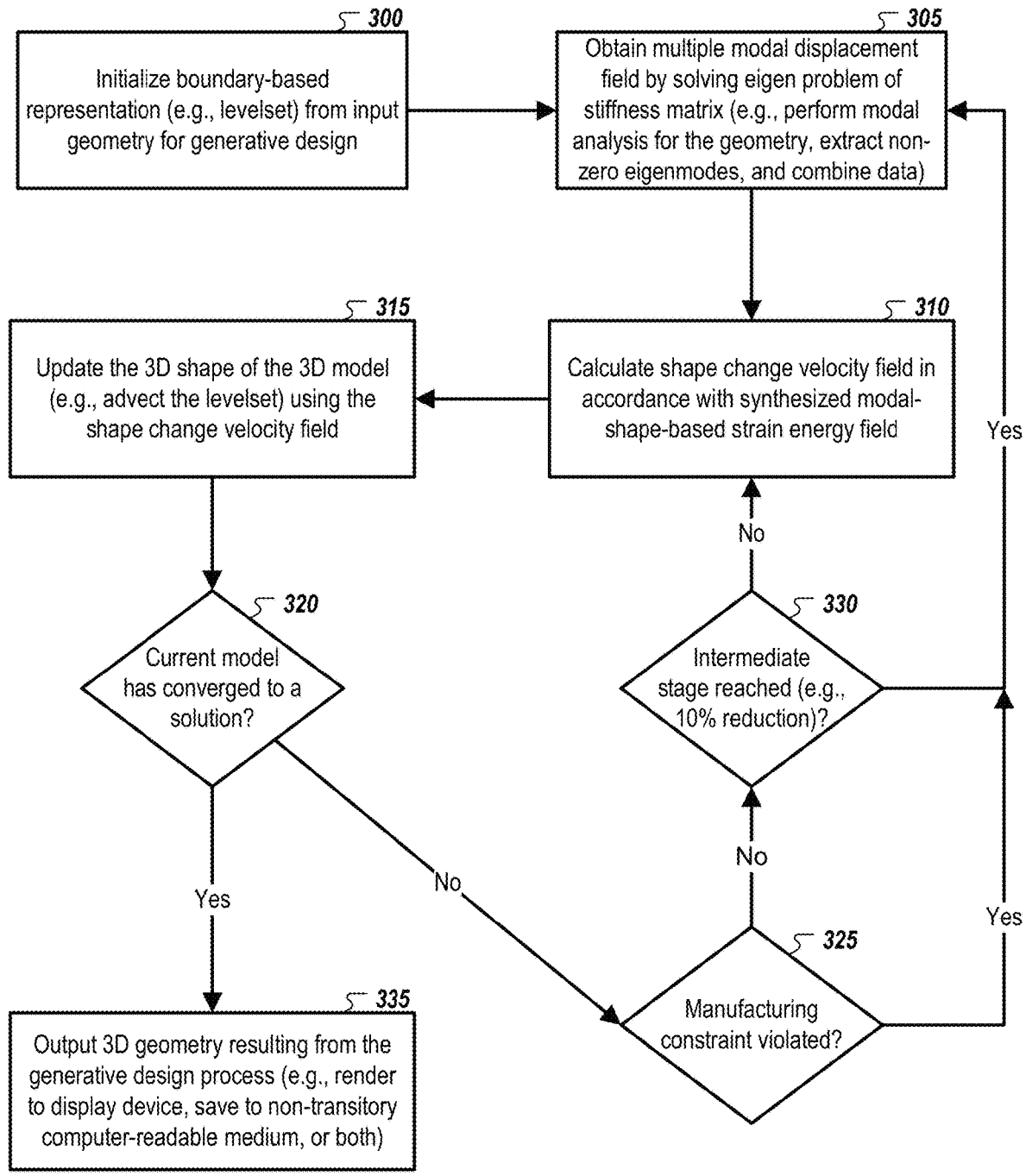
FIG. 3 shows another example of a generative design process that uses modal analysis to drive shape optimization.

FIG. 3 shows another example of a generative design process that uses modal analysis to drive shape optimization. A boundary-based representation (e.g., a levelset) is initialized 300, e.g., by CAD program(s) 116, from the input geometry of the 3D model to be generatively designed. A multiple modal displacement field is obtained 305, e.g., by CAD program(s) 116, by solving the eigen problem of the stiffness matrix. This can involve performing the modal analysis for the 3D geometry of the 3D model directly, or calling another routine to perform the modal analysis.

Also, the obtaining 305 can involve extracting non-zero eigenmodes and combining the data from the extracted non-zero eigenmodes to form a synthetic strain energy field for the 3D geometry of the 3D model. Note again that, with the modal analysis of the input shape, the generative design process can be driven using the modal-based strain energy field, even without any boundary conditions being defined. In particular, the user need not know where to apply a load and/or boundary condition.

The modal-based strain energy field provides a viable advection velocity for levelset topology optimization; the shape to be evolved/optimized can provide the most likely physical scenario to drive shape modification with no additional inputs being needed. Thus, a shape change velocity field is calculated 310, e.g., by CAD program(s) 116, in accordance with the synthesized modal-shape-based strain energy field, and the 3D shape of the 3D model is updated 315, e.g., by CAD program(s) 116, using the calculated shape change velocity field. For example, this can involve advecting 315 the levelset for the 3D shape of the 3D model by the velocity field calculated 310 by virtue of the synthesized modal shape.

In levelset-based topology optimization, the advection velocity field can consist of two factors: (1) the shape derivative of minimizing compliance, and (2) the imposition of the targeted volume constraint(s). The acquisition of the shape derivative of compliance is equal to computing a strain energy field for the given boundary conditions (e.g., loads and displacement constraints) and typically requires well-posed finite element modeling, i.e., CAE expertise. But because the modal-based strain energy field is used, the burden of applying a physically correct boundary condition is reduced, and the computation costs associated with running linear static FEA (e.g., with multiple load-cases) in a topology optimization loop can be eliminated.

A check 320 is made, e.g., by CAD program(s) 116, to see whether and the process continues modify the shape (e.g., geometry and topology) of the 3D model or has converged 320 to a stable solution (or a predefined number of iterations have been completed). In some implementations, the same synthesized strain energy field is used in each iteration. Thus, while the shape modification is determined 320 to continue, the shape change velocity can be recalculated 310 for the generatively designed shape in each of multiple iterations using the same strain energy field, and the generatively designed shape can be updated 315 in each of these multiple iterations using the recalculated shape change velocity field.

In some implementations, a check 325 is made, e.g., by CAD program(s) 116, to determine whether or not a manufacturing constraint has been violated. Note that any suitable velocity-based manufacturing filter (e.g., a 2.5-axis, 3-axis or 5-axis milling filter) can be used in the generative design processes described in this specification, thus facilitating extensibility of the described systems and techniques. When a manufacturing constraint is violated 325 in a given iteration, the synthetic strain energy field can be re-computed 305 using the current shape or using the most recent version of the shape that did not violate the manufacturing constraint, in order to maintain consistency between the strain energy and the shape.

In some implementations, the iterative modification of the 3D shape of the 3D model is performed in stages. This can involve a check 330, e.g., by CAD program(s) 116, to see whether or not an intermediate stage of the generative design process has been completed, and thus an updated synthetic strain energy field will be re-computed 305. For example, one or more intermediate stages can be defined based on a percentage reduction in volume for the generatively designed shape, e.g., a 10%, 20% or 30% reduction in volume. Upon the completion of each intermediate stage of generative design, an updated set of eigenmodes can be obtained 305 from an updated modal analysis of the generatively designed shape of the 3D model of the object, an updated proper subset of non-zero eigenmodes can be extracted 305 from the updated set of eigenmodes from the updated modal analysis, and data of the updated proper subset of non-zero eigenmodes can be combined 305 to update the strain energy field used in the iterative modification of the 3D shape of the 3D model.

By limiting the volume (or mass) reduction that is targeted in a given stage, a single computation of FEA modal analysis can be used for each iteration of the loop in that given stage. For example, a single computation of FEA modal analysis can be applicable to 30-50 iterations of advection when the mass reduction goal is confined to be less than 30%. This approach is effective and efficient since the relatively small volume/mass reduction will prevent big changes on both the computed eigenmodes and the strain energy distribution due to the corresponding modal deformation.

Other stage-based generative design processes can also be employed using the systems and techniques described in this specification. For example, a first stage of generative design can implement the processes described above in connection with FIG. 3, e.g., with two or more sub-stages in the first stage, to rapidly reduce the volume of the geometry for the 3D model of the object, and then a regular generative design process (using a boundary-based approach or a density-based approach) can be used in the second stage to produce a final shape that satisfied defined boundary conditions for the 3D model. In general, the focus of the systems and techniques described in this specification is on reducing run time and improving ease-of-use for the generative design process, at the expense of more accurate results; yet, the resulting designs can provide an acceptable first design that can be further refined using subsequent generative design or regular 3D model editing workflows.

Figure 4:
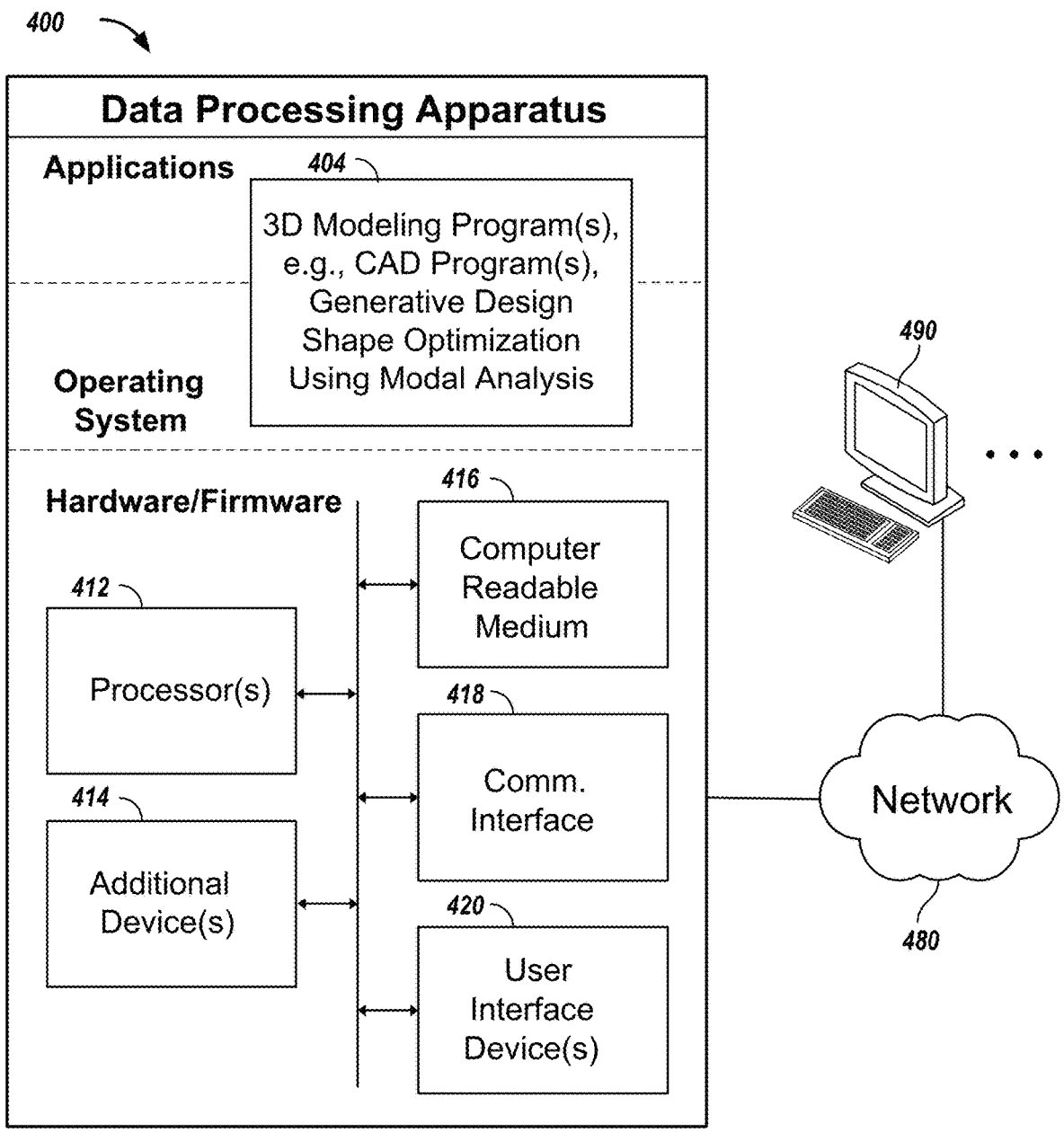
FIG. 4 is a schematic diagram of a data processing system including a data processing apparatus, which can be programmed as a client or as a server to implement the embodiments described in this specification.

FIG. 4 is a schematic diagram of a data processing system including a data processing apparatus 400, which can be programmed as a client or as a server to implement the embodiments described in this specification. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of one or more 3D modeling programs 404 that implement the systems and techniques described in this specification. Thus, the 3D modeling program(s) 404 can be CAD program(s) 404 (such as CAD program(s) 116) that perform generative design shape optimization using modal analysis (e.g., as part of a levelset-based topology optimization process).

The program(s) 404 can also potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses the communication interface 418 to communicate with one or more computers 490, for example, over the network 480. Examples of user interface devices 420 include a display, a camera, a speaker, a microphone, a tactile feedback device, a keyboard, a mouse, and VR and/or AR equipment. The data processing apparatus 400 can store instructions that implement operations associated with the program(s) described above, for example, on the computer readable medium 416 or one or more additional devices 414, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A method comprising:
    obtaining one or more design criteria and a three dimensional model of an object for which a corresponding physical structure is to be manufactured, wherein the three dimensional model is a computer-implemented model having a design space in which the physical structure is to be designed;
    selecting non-rigid body eigenmodes of a finite element stiffness matrix from a modal analysis of the three dimensional model of the object, wherein the non-rigid body eigenmodes that are selected are less than ten in number;
    superposing strain energy density fields extracted from the non-rigid body eigenmodes to form a synthetic strain energy field for the three dimensional model of the object using weighted strain energies from the strain energy density fields;
    iteratively modifying a shape of the three dimensional model of the object using the synthetic strain energy field to drive changes to the shape of the three dimensional model, wherein the iteratively modifying comprises
        calculating a shape change velocity field for the shape of the three dimensional model of the object using the synthetic strain energy field, and
        updating computer-implemented geometry of the shape within the design space using the shape change velocity field, wherein the geometry of the shape comprises computer representation of individual shape elements; and
    providing the shape of the three dimensional model of the object, which is useable in manufacturing the physical structure using one or more computer-controlled manufacturing systems.

2. The method of claim 1, wherein the selecting comprises selecting a number of the non-rigid body eigenmodes based on computer processing speed and a desired upper limit to processing time for the iteratively modifying.

3. The method of claim 2, comprising receiving input from a user specifying the desired upper limit to processing time for the iteratively modifying.

4. The method of claim 1, wherein the selecting comprises:
    obtaining one or more frequencies of vibration for which structural performance of the physical structure is to be enhanced; and
    extracting the strain energy density fields from the non-rigid body eigenmodes that correspond to the one or more frequencies of vibration.

5. The method of claim 4, wherein obtaining one or more frequencies of vibration comprises receiving user specification of a specified frequency or a range of frequencies for which structural performance of the physical structure is to be enhanced, and the selecting comprises identifying the non-rigid body eigenmodes that correspond to the one or more frequencies of vibration as those eigenmodes with resonate frequencies that fall within the range of frequencies or that are within a tolerance band around the specified frequency.

6. The method of claim 1, wherein the iteratively modifying comprises:
    checking for completion of a percentage reduction in volume for the shape that is less than a target volume reduction of an original volume of the three dimensional model of the object; and
    re-computing the synthetic strain energy field in response to the completion of the percentage reduction in volume for the shape that is less than the target volume reduction of the original volume, the re-computing comprising:
        performing an updated modal analysis on a modified version of the shape of the three dimensional model of the object after the completion of the percentage reduction in volume for the shape that is less than the target volume reduction of the original volume;
        selecting updated non-rigid body eigenmodes of an updated finite element stiffness matrix from the updated modal analysis; and
        superposing updated strain energy density fields extracted from the updated non-rigid body eigenmodes selected from the updated modal analysis to update the synthetic strain energy field used in the iteratively modifying after the completion of the percentage reduction in volume for the shape that is less than the target volume reduction of the original volume.

7. The method of claim 1, wherein the one or more design criteria comprise a manufacturing constraint, and the iteratively modifying comprises:
    checking whether the manufacturing constraint is violated in a given iteration of the iteratively modifying; and
    re-computing the synthetic strain energy field in response to the manufacturing constraint being violated in the given iteration, the re-computing comprising:
        performing an updated modal analysis on a modified version of the shape of the three dimensional model of the object after the manufacturing constraint is violated in the given iteration;
        selecting updated non-rigid body eigenmodes of an updated finite element stiffness matrix from the updated modal analysis; and
        superposing updated strain energy density fields extracted from the updated non-rigid body eigenmodes selected from the updated modal analysis to update the synthetic strain energy field used in the iteratively modifying after the given iteration.

8. The method of claim 1, wherein the calculating, in at least one iteration of the iteratively modifying, comprises:
    performing numerical simulation based on a boundary condition specification for the three dimensional model of the object to form a strain energy field for the three dimensional model of the object; and modifying the strain energy field formed by the numerical simulation using the synthetic strain energy field or modifying the synthetic strain energy field using the strain energy field formed by the numerical simulation.

9. The method of claim 1, wherein the iteratively modifying is performed without any input regarding boundary conditions for the three dimensional model of the object, and the method comprises providing a user interface that provides user control over weighting of the strain energies from the strain energy density fields to favor some eigenmodes over other eigenmodes.

10. The method of claim 1, wherein the providing comprises:

generating toolpath specifications for a manufacturing machine using the shape of the three dimensional model of the object; and manufacturing at least a portion of the physical structure, or a mold for the physical structure, with the manufacturing machine using the toolpath specifications.

11. A system comprising:

a non-transitory storage medium having instructions of a computer aided design program stored thereon; and one or more data processing apparatus configured to run the instructions of the computer aided design program to cause the one or more data processing apparatus to obtain one or more design criteria and a three dimensional model of an object for which a corresponding physical structure is to be manufactured, wherein the three dimensional model is a computer-implemented model having a design space in which the physical structure is to be designed;

select non-rigid body eigenmodes of a finite element stiffness matrix from a modal analysis of the three dimensional model of the object, wherein the non-rigid body eigenmodes that are selected are less than ten in number;

superpose strain energy density fields extracted from the non-rigid body eigenmodes to form a synthetic strain energy field for the three dimensional model of the object using weighted strain energies from the strain energy density fields;

iteratively modify a shape of the three dimensional model of the object using the synthetic strain energy field to drive changes to the shape of the three dimensional model, wherein the iterative modification comprises calculating a shape change velocity field for the shape of the three dimensional model of the object using the synthetic strain energy field, and updating computer-implemented geometry of the shape within the design space using the shape change velocity field, wherein the geometry of the shape comprises computer representation of individual shape elements; and provide the shape of the three dimensional model of the object, which is useable in manufacturing the physical structure using one or more computer-controlled manufacturing systems.

12. The system of claim 11, wherein the one or more data processing apparatus are configured to run the instructions of the computer aided design program to cause the one or more data processing apparatus to select a number of the non-rigid body eigenmodes based on computer processing speed and a desired upper limit to processing time for the iterative modification.

13. The system of claim 12, wherein the one or more data processing apparatus are configured to run the instructions of the computer aided design program to cause the one or more data processing apparatus to receive input from a user specifying the desired upper limit to processing time for the iterative modification.

14. The system of claim 11, wherein the one or more data processing apparatus are configured to run the instructions of the computer aided design program to cause the one or more data processing apparatus to:

obtain one or more frequencies of vibration for which structural performance of the physical structure is to be enhanced; and extract the strain energy density fields from the non-rigid body eigenmodes that correspond to the one or more frequencies of vibration.

15. The system of claim 14, wherein the one or more data processing apparatus are configured to run the instructions of the computer aided design program to cause the one or more data processing apparatus to iteratively modify the shape of the three dimensional model of the object by being configured to:

receive user specification of a specified frequency or a range of frequencies for which structural performance of the physical structure is to be enhanced; and identify the non-rigid body eigenmodes that correspond to the one or more frequencies of vibration as those eigenmodes with resonate frequencies that fall within the range of frequencies or that are within a tolerance band around the specified frequency.

16. The system of claim 11, wherein the one or more data processing apparatus are configured to run the instructions of the computer aided design program to cause the one or more data processing apparatus to iteratively modify the shape of the three dimensional model of the object by being configured to:

check for completion of a percentage reduction in volume for the shape that is less than a target volume reduction of an original volume of the three dimensional model of the object; and re-compute the synthetic strain energy field in response to the completion of the percentage reduction in volume for the shape that is less than the target volume reduction of the original volume by being configured to:

perform an updated modal analysis on a modified version of the shape of the three dimensional model of the object after the completion of the percentage reduction in volume for the shape that is less than the target volume reduction of the original volume;

select updated non-rigid body eigenmodes of an updated finite element stiffness matrix from the updated modal analysis; and superpose updated strain energy density fields extracted from the updated non-rigid body eigenmodes selected from the updated modal analysis to update the synthetic strain energy field used in the iterative modification after the completion of the percentage reduction in volume for the shape that is less than the target volume reduction of the original volume.

17. The system of claim 11, wherein the one or more design criteria comprise a manufacturing constraint, and the one or more data processing apparatus are configured to run the instructions of the computer aided design program to cause the one or more data processing apparatus to:

check whether the manufacturing constraint is violated in a given iteration of the iterative modification; and re-compute the synthetic strain energy field in response to the manufacturing constraint being violated in the given iteration by performing operations comprising:

performing an updated modal analysis on a modified version of the shape of the three dimensional model of the object after the manufacturing constraint is violated in the given iteration;

selecting updated non-rigid body eigenmodes of an updated finite element stiffness matrix from the updated modal analysis; and superposing updated strain energy density fields extracted from the updated non-rigid body eigenmodes selected from the updated modal analysis to update the synthetic strain energy field used in the iterative modification after the given iteration.

18. The system of claim 11, wherein the one or more data processing apparatus are configured to run the instructions of the computer aided design program to:

perform numerical simulation based on a boundary condition specification for the three dimensional model of the object to form a strain energy field for the three dimensional model of the object; and modify the strain energy field formed by the numerical simulation using the synthetic strain energy field or modify the synthetic strain energy field using the strain energy field formed by the numerical simulation.

19. The system of claim 11, wherein the one or more data processing apparatus are configured to run the instructions of the computer aided design program to cause the one or more data processing apparatus to:

iteratively modify the shape of the three dimensional model of the object without any input regarding boundary conditions for the three dimensional model of the object; and provide a user interface that provides user control over weighting of the strain energies from the strain energy density fields to favor some eigenmodes over other eigenmodes.

20. The system of claim 11, wherein the one or more data processing apparatus are configured to run the instructions of the computer aided design program to cause the one or more data processing apparatus to:

generate toolpath specifications for a manufacturing machine using the shape of the three dimensional model of the object; and manufacture at least a portion of the physical structure, or a mold for the physical structure, with the manufacturing machine using the toolpath specifications.

* * * * *

UNITED STATES PATENT AND TRADEMARK OFFICE
CERTIFICATE OF CORRECTION

| | | |
|---|---|---|
| PATENT NO. | : 12,229,476 B2 | Page 1 of 1 |
| APPLICATION NO. | : 17/236917 | |
| DATED | : February 18, 2025 | |
| INVENTOR(S) | : Burla et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this
Twenty-ninth Day of July, 2025

Coke Morgan Stewart
*Acting Director of the United States Patent and Trademark Office*